United States Patent
Sasabuchi et al.

(10) Patent No.: US 9,582,886 B2
(45) Date of Patent: Feb. 28, 2017

(54) OBJECT RECOGNITION DEVICE (71) Applicant: HONDA MOTOR CO., LTD., Minato-Ku, Tokyo (JP)

(72) Inventors: Yoji Sasabuchi, Shioya-Gun (JP); Katsuya Mizutani, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/897,083

(22) PCT Filed: May 22, 2014

(86) PCT No.: PCT/JP2014/063593
§ 371 (c)(1),
(2) Date: Dec. 9, 2015

(87) PCT Pub. No.: WO2015/005001
PCT Pub. Date: Jan. 15, 2015

(65) Prior Publication Data
US 2016/0137157 A1    May 19, 2016

(30) Foreign Application Priority Data
Jul. 8, 2013   (JP) ................................. 2013-142770

(51) Int. Cl.
G06K 9/00      (2006.01)
G06T 7/00      (2006.01)
B60R 21/0134   (2006.01)

(52) U.S. Cl.
CPC ........ *G06T 7/0044* (2013.01); *G06K 9/00805* (2013.01); *B60R 21/0134* (2013.01);
(Continued)

(58) Field of Classification Search
CPC ........... G06K 9/00805; G06K 9/00791; G06K 9/627; G06K 9/00201; G06K 9/00369;
(Continued)

(56) References Cited

U.S. PATENT DOCUMENTS

2004/0178945 A1* 9/2004 Buchanan ............... G01S 11/12
                                                    342/70
2005/0004761 A1* 1/2005 Takahama ............. G01S 17/936
                                                    701/301

(Continued)

FOREIGN PATENT DOCUMENTS

CN       1846115 A    10/2006
CN     101223416 A     7/2008

(Continued)

OTHER PUBLICATIONS

PCT/ISA/210 from PCT/JP2014/063593 in both the English and Japanese languages.

(Continued)

*Primary Examiner* — Kim Vu
*Assistant Examiner* — Jonathan S Lee
(74) *Attorney, Agent, or Firm* — Carrier Blackman & Associates, P.C.; Joseph P. Carrier; Jeffrey T. Gedeon (57) ABSTRACT An object recognition device includes: a radar that detects objects in the vicinity of a vehicle a camera that detects objects by capturing an image of the vicinity of the vehicle an identical object recognition unit configured to recognize that an object detected by the radar and an object detected by the camera are the same object when the objects are present within a predetermined position range. The identical object recognition unit determines whether the objects are the same object by reducing the predetermined position range when detection using the radar device or the camera is interrupted and then detection is started again.

5 Claims, 4 Drawing Sheets (52) U.S. Cl.
CPC ............ *G06T 2207/10044* (2013.01); *G06T 2207/30261* (2013.01)

(58) Field of Classification Search
CPC ...... G06K 2209/23; G06T 2207/30252; G06T 2207/30261; G06T 2207/10004; G06T 2207/10012; G06T 2207/10044
See application file for complete search history.

(56) References Cited

U.S. PATENT DOCUMENTS

| | | | | |
|---|---|---|---|---|
| 2005/0225479 | A1* | 10/2005 | Shirai | G01S 13/867 342/70 |
| 2005/0271253 | A1* | 12/2005 | Ohta | G01C 3/08 382/103 |
| 2007/0055446 | A1* | 3/2007 | Schiffmann | G01S 7/4026 701/301 |
| 2009/0067675 | A1* | 3/2009 | Tan | G06K 9/00798 382/104 |
| 2009/0135065 | A1 | 5/2009 | Tsuchida et al. | |
| 2009/0201192 | A1 | 8/2009 | Tokoro et al. | |
| 2009/0251355 | A1* | 10/2009 | Nanami | G01S 13/931 342/27 |
| 2012/0035846 | A1 | 2/2012 | Sakamoto et al. | |
| 2013/0002470 | A1* | 1/2013 | Kambe | G01S 13/867 342/55 |
| 2014/0032093 | A1* | 1/2014 | Mills | B60W 40/107 701/301 |
| 2014/0203959 | A1* | 7/2014 | Kriel | G01S 13/867 342/52 |
| 2014/0219506 | A1* | 8/2014 | Foltin | G06K 9/00825 382/104 |
| 2014/0333467 | A1* | 11/2014 | Inomata | G01S 13/867 342/27 |
| 2015/0262375 | A1* | 9/2015 | Inomata | G06K 9/00805 382/107 |

FOREIGN PATENT DOCUMENTS

| | | | |
|---|---|---|---|
| CN | 101395492 | A | 3/2009 |
| CN | 101542523 | A | 9/2009 |
| CN | 102460207 | A | 5/2012 |
| CN | 102542843 | A | 7/2012 |
| CN | 102947863 | A | 2/2013 |
| JP | 2002-183737 | A | 6/2002 |
| JP | 2005-157765 | A | 6/2005 |
| JP | 2007-132748 | A | 5/2007 |
| JP | 2007-226680 | A | 9/2007 |
| JP | 2010-249613 | A | 11/2010 |
| JP | 2010-250501 | A | 11/2010 |
| JP | 2012237624 | A | 12/2012 |
| JP | 2013-117475 | A | 6/2013 |
| JP | 2013-145205 | A | 7/2013 |

OTHER PUBLICATIONS

Office Action mailed Jul. 5, 2016 corresponding to Chinese Patent Application No. 201480031947.7.

* cited by examiner

OBJECT RECOGNITION DEVICE

TECHNICAL FIELD

The present invention relates to an object recognition device.

Priority is claimed on Japanese Patent Application No. 2013-142770, filed on Jul. 8, 2013 the content of which is incorporated herein by reference.

BACKGROUND ART

Hitherto, a device that detects pedestrians using a radar device and a camera mounted on a vehicle has been known (see, for example Patent Document 1).

CITATION LIST

Patent Literature

[Patent Document 1] Japanese Unexamined Patent Application, First Publication No. 2005-157765

SUMMARY OF INVENTION

Technical Problem

Incidentally, in the device according to the above related art, a method is known of determining detection should be continued multiple times in order to determine whether an object detected by a radar device and an object detected by a camera are the same as each other. However, according to this method, when the detection of an object using the radar device is interrupted and the recognition of the same object is reset, whether detection should be continued multiple times is determined even in a case where detection started again after that, and thus there is a problem in that a delay occurs in control.

An aspect according to the present invention is contrived in view of such circumstances, and an object thereof is to provide an object recognition device capable of rapidly and accurately detecting au object which is present outside of a host vehicle.

Solution to Problem

In order to solve the above problem and achieve such an object, the present invention adopts the following aspects.

(1) According to an aspect of the present invention, there is provided an object recognition device including: a radar that detects objects in the vicinity of a vehicle; a camera that detects objects by capturing an image of the vicinity of the vehicle; and an identical object recognition unit configured to recognize that an object detected by the radar and an object detected by the camera are the same object when the objects are present within a predetermined position range, wherein the identical object recognition unit determines whether the objects are the same object by reducing the predetermined position range when detection using the radar or the camera is interrupted and then detection is started again.

(2) In the aspect of the above (1), the identical object recognition unit may gradually increase the predetermined position range when the same object is not present after the predetermined position range is reduced.

(3) In the aspect of the above (1) or (2), the identical object recognition unit may recognize that the object detected by the radar and the object detected by the camera are the same object when the objects are present within the predetermined position range for a predetermined period of time, and determine whether the objects are the same object by shortening the predetermined period of time when detection using the radar or the camera is interrupted and then detection is started again.

(4) In aspect of the above (3), the identical object recognition unit may gradually increase the predetermined position range when the same object is not present after the predetermined position range is reduced, and change the predetermined period of time with an increasing trend along with an increase of the predetermined position range.

(5) According to another aspect of the present invention, there is provided an object recognition device including: a radar that detects objects in the vicinity of a vehicle; a camera that detects objects by capturing an image of the vicinity of the vehicle; and an identical object recognition unit configured to recognize that an object detected by the radar and an object detected by the camera are the same object when the objects are present within a predetermined position range for a predetermined period of time, wherein the identical object recognition unit determines whether the objects are the same object by shortening the predetermined period of time when detection using the radar or the camera is interrupted and then detection is started again.

Advantageous Effects of Invention

According to the aspect of the above (1), a state continues in which it is recognized that the objects having been detected by the radar device and the camera in the past are the same object. Therefore, when detection is started again even in a case where detection is temporarily interrupted in the radar device or the camera, it is possible to determine that the possibility of the same object being detected is high. Thereby, even when a predetermined position range for determining whether objects detected again are the same object is reduced, it is possible to secure the accuracy of recognition, rapidly perform a recognition process, and to bring control of vehicle behavior or the like into operation earlier.

In the case of the above (2), the reduced predetermined position range is gradually increased to a predetermined position range previously set, thereby allowing the same object to be recognized.

In the case of the above (3), a state continues in which it is recognized that the objects having been detected by the radar device and the camera in the past are the same object. Therefore, when detection is started again even in a case where detection is temporarily interrupted in the radar device or the camera, it is possible to determine that the possibility of the same detection object being detected is high. Thereby, even when a predetermined period of time for determining whether objects detected again are the same object is shortened, it is possible to secure the accuracy of recognition, rapidly perform a recognition process, and to bring control of vehicle behavior or the like into operation earlier.

In the case of the above (4), the predetermined period of time is changed with an increasing trend with the gradual increase of the reduced predetermined position range to a predetermined position range previously set, thereby allowing the same object to be recognized.

According to the aspect of the above (5), a state continues in which it is recognized that the objects having been detected by the radar device and the camera in the past are the same object. Therefore, when detection is started again even in a case where detection is temporarily interrupted in the radar device or the camera, it is possible to determine that the possibility of the same detection object being detected is high. Thereby, even when a predetermined period of time for determining whether objects detected again are the same object is shortened, it is possible to secure the accuracy of recognition, rapidly perform a recognition process, and to bring control of vehicle behavior or the like into operation earlier.

DESCRIPTION OF EMBODIMENTS

Hereinafter, an object recognition device according to an embodiment of the present invention will be described with reference to the accompanying drawings.

Figure 1:
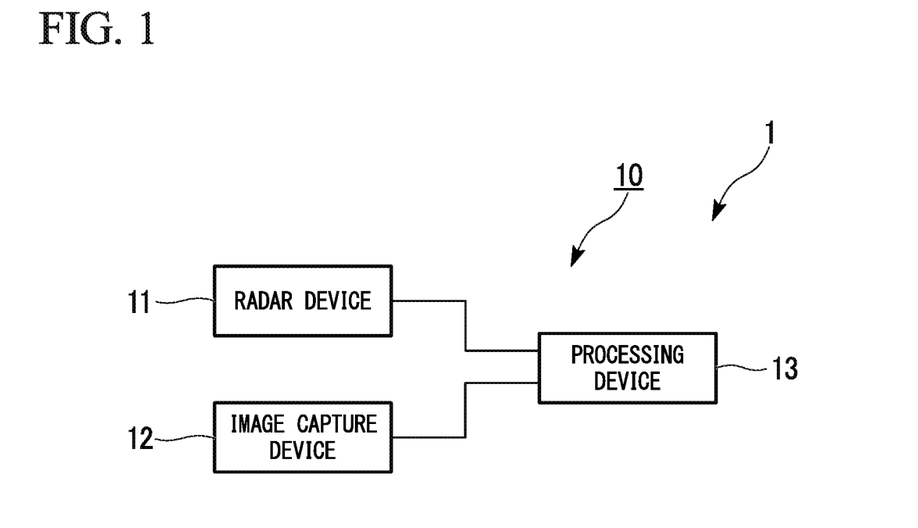
FIG. 1 is a configuration diagram of an object recognition device accord an embodiment of the present invention.

An object recognition device 10 according to the present embodiment is mounted on, for example, a vehicle 1, and can recognize objects (such as, for example, pedestrians, other vehicles, and structures) which are present outside of the vehicle 1. As shown in FIG. 1, the object recognition device 10 includes a radar device 11, an image capture device 12, and a processing device 13.

The radar device 11 divides a detection target region which is set outside of the vehicle 1 into a plurality of angle regions, and scans each of the angle regions to transmit radar radio waves which are electromagnetic waves. The radar device receives reflected waves generated by the respective transmitted waves being reflected by objects (such as, for example, pedestrians, other vehicles) located outside of the vehicle 1. The radar device 11 generates detection signals in response to the transmitted waves and the reflected waves, for example, detection signals relating to distances from the radar device 11 to external objects, relative speeds of the external objects based on a Doppler effect, relative positions or orientations of the external objects with respect to the radar device 11, and the like, and outputs the generated detection signals to the processing device 13. For example, when the radar device 11 is a millimeter-wave radar, the radar device 11 outputs beat signals obtained by mixing the transmitted waves and the reflected waves as the detection signals.

The image capture device 12 includes a camera, and captures an image of an image capture region which is set outside of the vehicle 1. The image capture device 12 generates image data by performing predetermined image processing on the image obtained through image capture, and outputs the generated image data to the processing device 13.

The processing device 13 detects objects present in the vicinity of the vehicle 1 using the detection signals which are output from the radar device 11 and the image data which is output from the image capture device 12. The processing device 13 recognizes the objects based on the image data by performing a predetermined recognition process on the image data which is output from the image capture device 12. More specifically, the processing device 13 recognizes attributes of the objects, and identities pedestrians, other vehicles, structures and the like, for example, as objects located in the vicinity of the vehicle 1. The processing device 13 calculates relative positions, speeds, accelerations and the like of the recognized objects with respect to the image capture device 12.

Figure 2A:
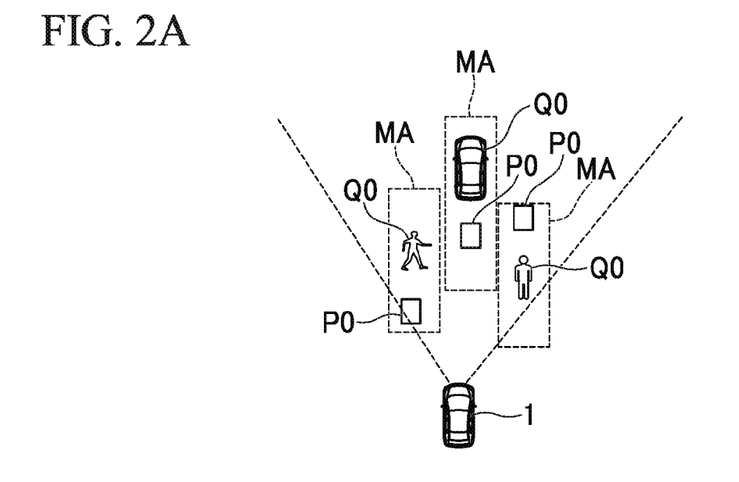
FIG. 2A is a diagram illustrating an object detected by a radar device and an object detected by an image capture device in a snatching range of the object recognition device according to the embodiment of the present invention.
Figure 2B:
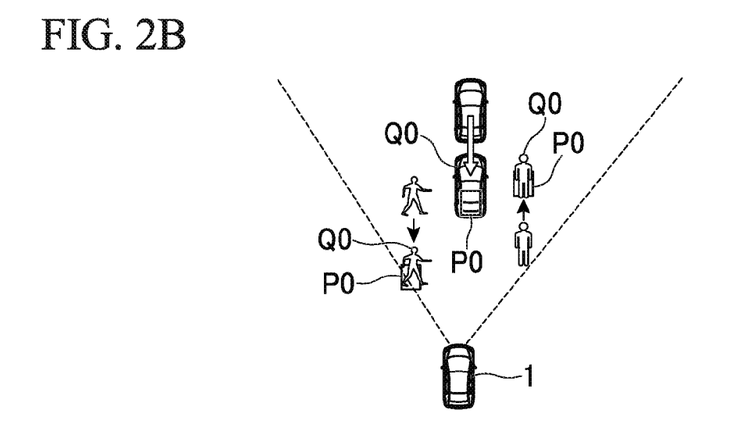
FIG. 2B is a diagram illustrating position correction and matching between an object detected by a radar device and an object detected by an image capture device in a search range of the object recognition device according to the embodiment of the present invention.

When an object detected by the radar device 11 and an object detected by the image capture device 12 are present within a predetermined position range (matching range) for a predetermined period of time (established time), the processing device 13 recognizes that the objects are the same object. For example, as shown in FIG. 2A, when it is detected that an object P0 detected by the radar device 11 and an object Q0 detected by the image capture device 12 are present within a first matching range MA having a previously-set size over a number of processes (that is, equivalent to established time) continuing for more than a first number of times of establishment NA previously set, the processing device 13 recognizes that the objects P0 and Q0 are the same object. For example, as shown in FIG. 2B, the processing device 13 matches the objects P0 and Q0 by correcting the positions of the objects P0 and Q0 recognized to be the same object so as to be made to coincide with each other.

Meanwhile, in the processing device 13, the position of the matching range may be set on the basis of the position of the object detected by the radar device 11 or the position of the object detected by the image capture device 12, and may be appropriate set so that the positions of the objects detected by the radar device 11 and the image capture device 12 are included.

In addition, when matching between the objects detected by the radar device 11 and the image capture device 12 is performed, the processing device 13 may perform the matching therebetween on the basis of the position of any one of the objects, but preferably corrects the position of the object detected by the image capture device 12 on the basis of the position of the object detected by the radar device 11.

Meanwhile, when the processing device 13 recognizes that the objects detected by the radar device 11 and the image capture device 12 are the same object and establishes the matching therebetween, the processing device may add information such as attributes recognized with respect to the object detected by the image capture device 12, for example, to information such as the distance, the position, the speed, and the acceleration of the object detected by the radar device 11. The processing device 13 can execute various control operations for example, contact avoidance with an object, automatic following of a preceding vehicle, and the like) of the vehicle 1 on the basis of various information associated with the objects in which the matching is established.

Figure 2C:
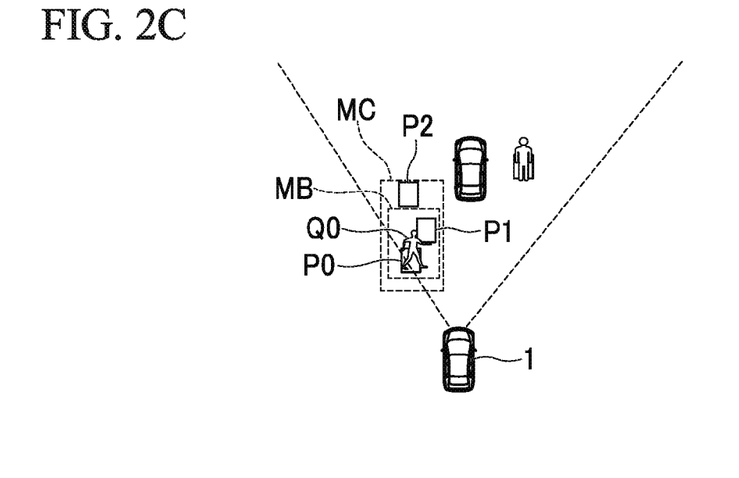
FIG. 2C is a diagram illustrating an object detected by a radar device and an object detected by an image capture device in a reduced matching range of the object recognition device according to the embodiment of the present invention.

When detection using the radar device 11 or the image capture device 12 is interrupted and then detection is started again, the processing device 13 determines whether the objects are the same object by reducing a matching range. For example, as shown in FIG. 2C, when detection using the radar device 11 is interrupted and then detection is started again, the processing device 13 reduces the first matching range MA having a previously-set size to a second matching range MB smaller than that. The processing device 13 reduces the first number of times of establishment NA previously set to a second number of times of establishment NB smaller than that, in association with the reduction of the first matching range MA having a previously-set size to the second matching range MB. The processing device 13 determines whether an object P1 newly detected by the radar device 11 and the object Q0 detected by the image capture device 12 are present within the second matching range MB over the number of processes continuing for more than the reduced second number of times of establishment NB.

Meanwhile, when the first number of times of establishment NA previously set is reduced to the second number of times of establishment NB smaller than that, the processing device 13 may estimate the current position of an object through position estimation based on a history of the position, the speed, the acceleration and the like of the object before detection using the radar device 11 or the image capture device 12 is interrupted (that is, in a period in which detection continues). As the estimated current position of the object becomes closer to the position of the object newly detected by the radar device 11 when detection is started again, the processing device 13 may reduce the second number of times of establishment NB to be smaller than that.

Further, when the first matching range MA having a previously-set size is reduced to the second matching range MB smaller than that, and then the same object is not present within the second matching range MB, the processing device 13 gradually increases the second matching range MB to a third matching range MC greater than that. The processing device 13 changes the second number of times of establishment NB to the third number of times of establishment NC greater than that, with an increasing trend, in association with the gradual increase of the second matching range MB to the third matching range MC greater than that. The processing device 13 determines whether an object P2 newly detected by the radar device 11 and the object Q0 detected by the image capture device 12 are present within the third matching rank MC over the number of processes continuing for more than the increased third number of times of establishment NC.

Meanwhile, the processing device 13 sets the position of a snatching range when detection using the radar device 11 or the image capture device 12 is temporarily interrupted and then detection is started again, for example, through position estimation based on a history of the position, the speed, the acceleration and the like of the object before detection using the radar device 11 or the image capture device 12 is interrupted (that is, in a period in which detection continues). Further, the processing device 13 may set the position of a matching range through position estimation based on attributes (for example, movement speeds different from each other in pedestrians and other vehicles, and the like) recognized with respect to the objects based on the image data.

The object recognition device 10 according to the present embodiment includes the above configuration, and operations of the object recognition device 10 will be described next.

Meanwhile, processes of step S01 to step S14 shown below are repeatedly executed, for example, in a predetermined period or the like.

Figure 3:
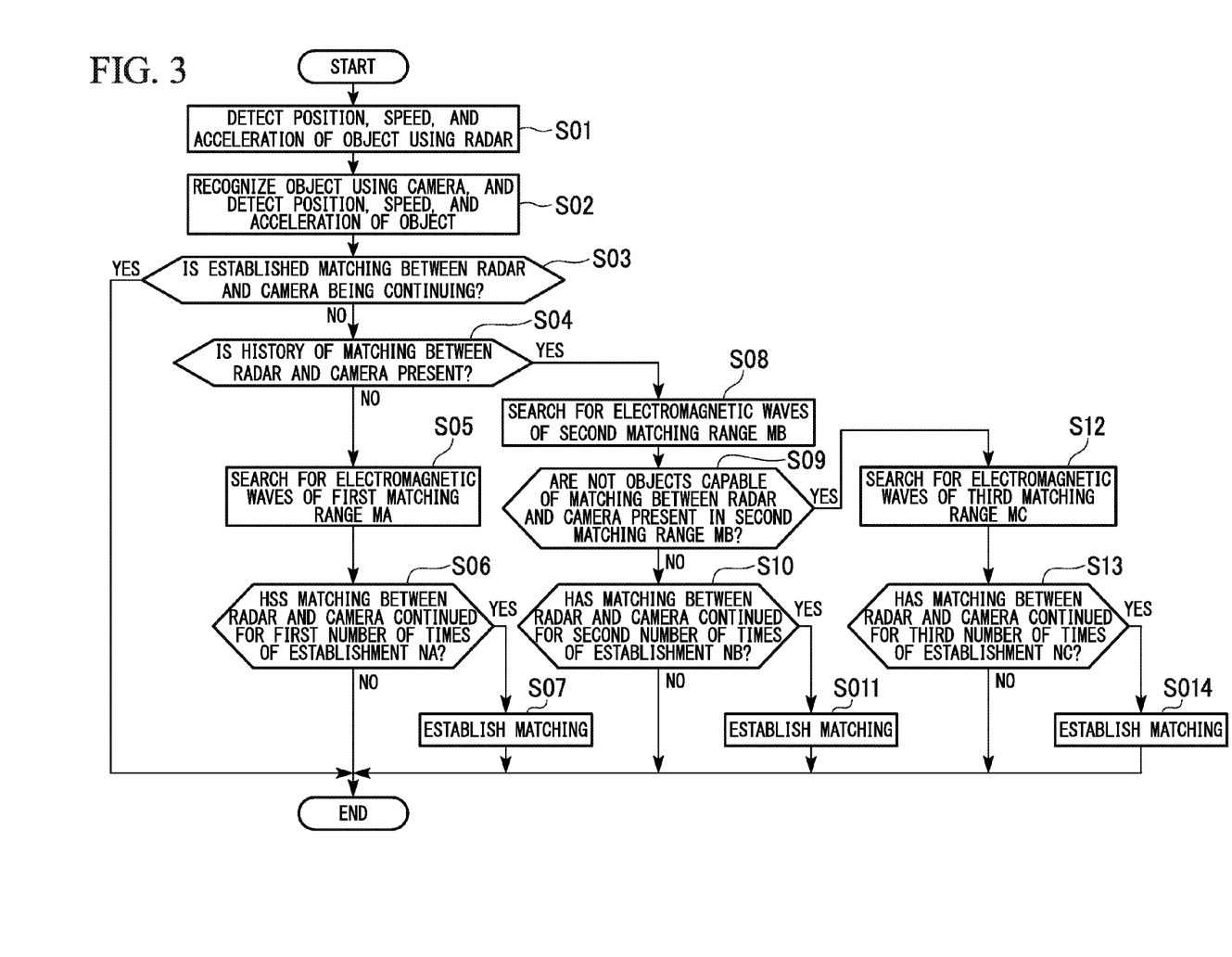
FIG. 3 is a flow diagram illustrating operations of the object recognition device according to the embodiment of the present invention.

First, for example, in step S01 shown in FIG. 3, the processing device 13 detects the position, the speed, the acceleration and the like of the object detected by the radar device 11.

Next, in step S02, the processing device 13 performs a process of recognizing the object detected by the image capture device 12, and detects the position, the speed, the acceleration and the like of the object.

Next, in step S03, the processing device 13 determines whether a state where matching between the objects detected by the radar device 11 and the image capture device 12 is established is continuing.

When the determination result is "YES", the process proceeds to the end.

On the other hand, when the determination result is "NO", the process proceeds to step S04.

Next, in step S04, the processing device 13 determines whether a history is present in which matching between the objects detected by the radar device 11 and the image capture device 12 has been performed.

When the determination result is "YES", the process proceeds to step S08.

On the other hand, when the determination result is "NO", the process proceeds to step S05 described later.

Figure 4:
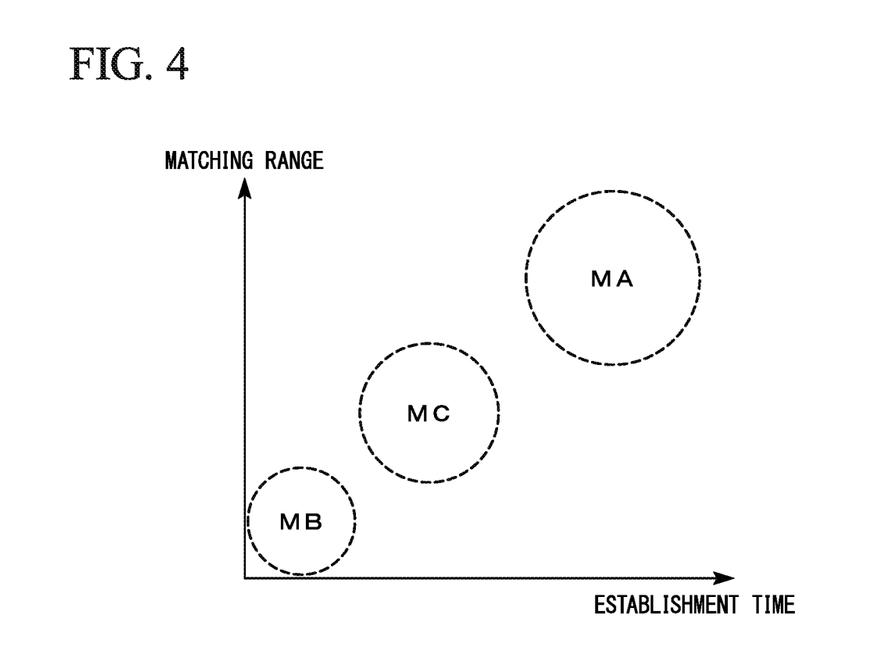
FIG. 4 is a diagram illustrating a correspondence relation between a matching range and an established time which is used by the object recognition device according to the embodiment of the present invention.

In step S05, the processing device 13 searches for electromagnetic waves of the first matching range MA, for example, as shown in FIG. 4.

Next, in step S06, the processing device 13 determines whether the matching between the objects detected by the radar device 11 and the image capture device 12 has continued for the first number of times of establishment NA previously set.

When the determination result is "NO", the process proceeds to the end.

On the other hand, when the determination result is "YES", the process proceeds to step S07. In step S07, the matching between the objects detected by the radar device 11 and the image capture device 12 is established, and the process proceeds to the end.

In addition, in step S08, the processing device 13 searches for electromagnetic waves of the second matching range MB which is smaller than the first matching range MA, and with which the second number of times of establishment NB smaller than the first number of times of establishment NA of the first matching range MA is associated.

Next, in step S09, the processing device 13 determines whether objects capable of being matched with each other are absent in the second matching range MB.

When the determination result is "NO", the process proceeds to step S10.

On the other hand, when the determination result is "YES", the process proceeds to step S12 described later.

In step S10, the processing device 13 determines whether the matching between the objects detected by the radar device 11 and the image capture device 12 has continued for the second number of times of establishment NB.

When the determination result is "NO", the process proceeds to the end.

On the other hand, when the determination result is "YES", the process proceeds to step S11. In step S11, the matching between the objects detected by the radar device 11 and the image capture device 12 is established, and the process proceeds to the end.

In step S12, the processing device 13 searches for electromagnetic waves of the third matching range MC with which the third number of times of establishment NC smaller than the first number of times of establishment NA and greater than the second number of times of establishment NB is associated, and which is smaller than a first matching range MA and greater than the second matching range MB.

In step S13, the processing device 13 determines whether the matching between the objects detected by the radar device 11 and the image capture device 12 has continued for the third number of times of establishment NC.

When the determination result is "NO", the process proceeds to the end.

On the other hand, when the determination result is "YES", the process proceeds to step S14. In step S14, the matching between the objects detected by the radar device 11 and the image capture device 12 is established, and the process proceeds to the end.

As described above, according to the object recognition device 10 of the present embodiment, a state continues in which it is recognized that the objects having been detected by the radar device 11 and the image capture device 12 in the past are the same object. Therefore, when detection is started again even in a case where detection is temporarily interrupted in the radar device 11 or the image capture device 12, it is possible to determine that the possibility of the same object being detected is high. Thereby, even when a predetermined position range for determining whether objects detected again are the same object is reduced, it is possible to secure the accuracy of recognition, rapidly perform a recognition process, and to bring control of vehicle behavior or the like into operation earlier.

Further, even when a predetermined period of time for determining whether the objects detected again are the same object is shortened, it is possible to secure the accuracy of recognition, rapidly perform a recognition process, and to bring control of vehicle behavior or the like into operation earlier.

Further, when the same object is not present after detection is started again, the reduced predetermined position range is gradually increased to a predetermined position range previously set, and the shortened predetermined period of time is changed with an increasing trend, thereby allowing the same object to be accurately recognized.

First Modification Example

Meanwhile, in the aforementioned embodiment, when the objects detected by the radar device 11 and the image capture device 12 are present within a predetermined position range (matching range) for a predetermined period of time (established time), the processing device 13 recognizes that the objects are the same object, but there limitation thereto. For example, when the objects detected by the radar device 11 and the image capture device 12 are present within a predetermined position range, the processing device 13 may recognize that the objects are the same object.

Second Modification Example

Meanwhile, in the aforementioned embodiment, the processing device 13 changes the matching range and the number of times of establishment when the same object is not present before and after detection using the radar device 11 or the image capture device 12 is temporarily interrupted, and after detection is started again, but there is no limitation thereto. For example, the processing device 13 may change only the matching range or the number of times of establishment.

The present embodiment described above is illustrative of an example of implementing the invention, and it goes without saying that the present invention is not construed to be limited to the aforementioned embodiment.

For example, in the aforementioned embodiment, a case where detection using the radar device 11 is interrupted has been described, but it is also possible to similarly cope with a case where detection using the image capture device 12 is interrupted, without being limited thereto.

REFERENCE SIGNS LIST

1: vehicle
10: object recognition device
11: radar device (radar)
12: image capture device (camera)
13: processing device (identical object recognition unit)

The invention claimed is:

1. An object recognition device comprising:
a radar that detects a radar-detected object in a vicinity of a vehicle and outputs detection signals;
a camera that detects a camera-detected object by capturing an image of the vicinity of the vehicle and outputs image data; and
a processor configured to recognize the radar-detected object from the detection signals and the camera-detected object from the image data,
wherein the processor is configured to recognize that the radar-detected object and the camera-detected object are a same actual object when the the radar-detected object and the camera-detected object are present within a predetermined position range,
wherein the processor is configured to determine whether the the radar-detected object and the camera-detected object are the same actual object by reducing the predetermined position range when detection using the radar or the camera is interrupted and then detection is started again.

2. The object recognition device according to claim 1, wherein the processor gradually increases the predetermined position range when the same object is not present after the predetermined position range is reduced.

3. The object recognition device according to claim 1, wherein the processor recognizes that the radar-detected object and the camera-detected object are the same actual object when the radar-detected object and the camera-detected object are present within the predetermined position range for a predetermined period of time, and wherein the processor determines whether the radar-detected object and the camera-detected object are the same actual object by reducing the predetermined position range when detection using the radar or the camera is interrupted and then detection is started again.

4. The object recognition device according to claim 3, wherein the processor gradually increases the predetermined position range when the same object is not present after the predetermined position range is reduced, and changes the predetermined period of time with an increasing trend along with an increase of the predetermined position range.

5. The object recognition device according to claim 2, wherein the processor recognizes that the radar-detected object and the camera-detected object are the same actual object when the radar-detected object and the camera-detected object are present within the predetermined position range for a predetermined period of time, and wherein the processor determines whether the radar-detected object and the camera-detected object are the same actual object by reducing the predetermined position range when detection using the radar or the camera is interrupted and then detection is started again.

* * * * *